United States Patent
Fujii et al.

(10) Patent No.: US 10,146,313 B2
(45) Date of Patent: Dec. 4, 2018

(54) INPUT DEVICE AND ELECTRONIC APPARATUS

(71) Applicant: LENOVO (SINGAPORE) PTE. LTD., Singapore (SG)

(72) Inventors: Kazuo Fujii, Yokohama (JP); Masayuki Amano, Yokohama (JP); Kenji Watamura, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/659,865

(22) Filed: Jul. 26, 2017

(65) Prior Publication Data

US 2018/0067556 A1 Mar. 8, 2018

(30) Foreign Application Priority Data

Sep. 7, 2016 (JP) .................. 2016-174402

(51) Int. Cl.
*G06F 3/01* (2006.01)
*G06F 3/0354* (2013.01)
*G06F 3/02* (2006.01)

(52) U.S. Cl.
CPC .......... *G06F 3/016* (2013.01); *G06F 3/03547* (2013.01); *G06F 3/02* (2013.01)

(58) Field of Classification Search
CPC ......... G06F 3/016; G06F 3/03547; G06F 3/02
See application file for complete search history.

(56) References Cited

U.S. PATENT DOCUMENTS

| | | | |
|---|---|---|---|
| 2014/0362020 A1* | 12/2014 | Rothkopf | G06F 1/1652 345/173 |
| 2015/0084898 A1* | 3/2015 | Ishikawa | G06F 1/169 345/173 |
| 2015/0116205 A1* | 4/2015 | Westerman | G06F 3/016 345/156 |

FOREIGN PATENT DOCUMENTS

JP 2013025422 A 2/2013

* cited by examiner

*Primary Examiner* — Andrew Sasinowski
(74) *Attorney, Agent, or Firm* — Shimokaji IP

(57) ABSTRACT

The present invention provides an input device capable of providing a satisfactory operational feeling while achieving a simple structure and a reduced thickness of the device, and an electronic apparatus provided with the input device. The input device includes a touchpad having a sensor plate, which functions as a sensor capable of detecting a touch operation on an operation surface, an actuator driven when a touch operation is detected by the sensor plate, and a vibration generation part on the rear surface of the touchpad, and which generates a vibration by being pressed by the driven actuator and applies the vibration to the touchpad.

3 Claims, 5 Drawing Sheets

INPUT DEVICE AND ELECTRONIC APPARATUS

FIELD OF THE INVENTION

The present invention relates to an input device provided with a touch operation unit, which enables touch operation, and an electronic apparatus provided with the input device.

BACKGROUND OF THE INVENTION

A laptop personal computer (laptop PC) includes an input device having a touchpad, which replaces a mouse, in addition to a keyboard device. A touchpad is used to operate a cursor shown on a display device in response to touch operation performed by a fingertip or a pen tip.

Regarding the input device provided with a touchpad, the present applicant has proposed a configuration that enables touch operation and depression operation (refer to Patent Document 1).

[Patent Document 1] Japanese Patent Application Laid-Open No. 2013-25422

In the input device described in Patent Document 1 mentioned above, when a depression operation is performed, the operation surface of the touchpad is mechanically depressed so as to depress a metal dome switch located on a rear surface. This enables an operator to obtain appropriate click feeling, which leads to satisfactory operational feeling. The configuration, however, requires a mechanism that vertically moves the touchpad, so that the configuration tends to be complicated and also limits the reduction in the thickness of the entire input device.

SUMMARY OF THE INVENTION

The present invention has been made to overcome the shortcomings of the conventional art described above, and it is an object of the invention to provide an input device capable of providing satisfactory operational feeling while at the same time achieving a simple structure and a reduced thickness of the device, and an electronic apparatus provided with the input device.

An input device according to the present invention includes: a touch operation unit which has a sensor capable of detecting a touch operation on an operation surface; an actuator driven in the case where the touch operation is detected by the sensor; and a vibration generation part which is provided on a rear surface of the touch operation unit and which generates a vibration by being pressed by the driven actuator and applies the vibration to the touch operation unit.

The configuration described above enables the input device to provide an operator with click feeling by the vibration from the vibration generation part at a click operation without using a mechanical mechanism or the like which vertically moves the touch operation unit. Thus, satisfactory operational feeling can be obtained while at the same time simplifying the structures of the peripheral sections of the touch operation unit so as to reduce the thickness of the device.

The vibration generation part may be composed of an elastic member, which develops elastic buckling distortion when pressed by the actuator thereby to apply a vibration to the touch operation unit. In this case, the touch operation unit is shaken by the vibration from the elastic buckling distortion of the vibration generation part, thus making it possible to obtain click feeling that is similar to the click feeling obtained by actual switching.

The vibration generation part may be configured to have a shape like a hollow dome formed of a metal.

The vibration generation part may be composed of a metal dome switch. This enables control based on a detection signal obtained when the vibration generation part is pressed.

The actuator may be composed of a solenoid which moves a plunger when energized and presses the vibration generation part. This simplifies the structure for pressing the vibration generation part, thus enabling the entire device to be further simplified and thinner and also permitting a reduction in cost, as compared with a case where, for example, a typical rotary motor is used. Furthermore, the input device can generate a desired vibration merely by pressing the vibration generation part by the plunger of the actuator composed of the solenoid. Hence, the actuator can be controlled substantially by simply being turned on/off, thus obviating the need for detailed control or adjustment.

The touch operation unit may be composed of a touchpad or a button switch. If the touch operation unit is composed of a touchpad, then click feeling can be obtained when a touch operation is performed on the touchpad without providing a mechanism for vertically moving the touchpad. If the touch operation unit is composed of a button switch which has a sensor capable of detecting a touch operation, then the click feeling can be obtained when a touch operation is performed on the button switch.

The vibration generation part may be provided such that the vibration generation part protrudes from the rear surface of the touch operation unit, and the plunger may be disposed such that the plunger is movable in a direction parallel to the rear surface of the touch operation unit so as to press the vibration generation part from a side. In this configuration, the advancing/retreating direction of the plunger coincides with the planar direction of the touch operation unit, thus enabling the entire device to be even thinner.

An electronic apparatus according to the above-described aspects of the present invention includes an input device having the above-described configuration, a keyboard device, and a display device which performs display based on input operations performed through the input device and the keyboard device. The configuration according to the above-described aspects of the invention enables the chassis of the electronic apparatus to be made smaller and thinner by incorporating the input device that permits reductions in size and thickness.

The above-described aspects of the present invention can provide satisfactory operational feeling while at the same time achieving a simplified structure of the peripheral sections of a touch operation unit so as to achieve a reduction in thickness.

DETAILED DESCRIPTION OF THE INVENTION

Referring to the accompanying drawings, a preferred embodiment of the input device according to the above-described aspects of the present invention will be described in detail in relation with an electronic apparatus provided with the input device.

Figure 1:
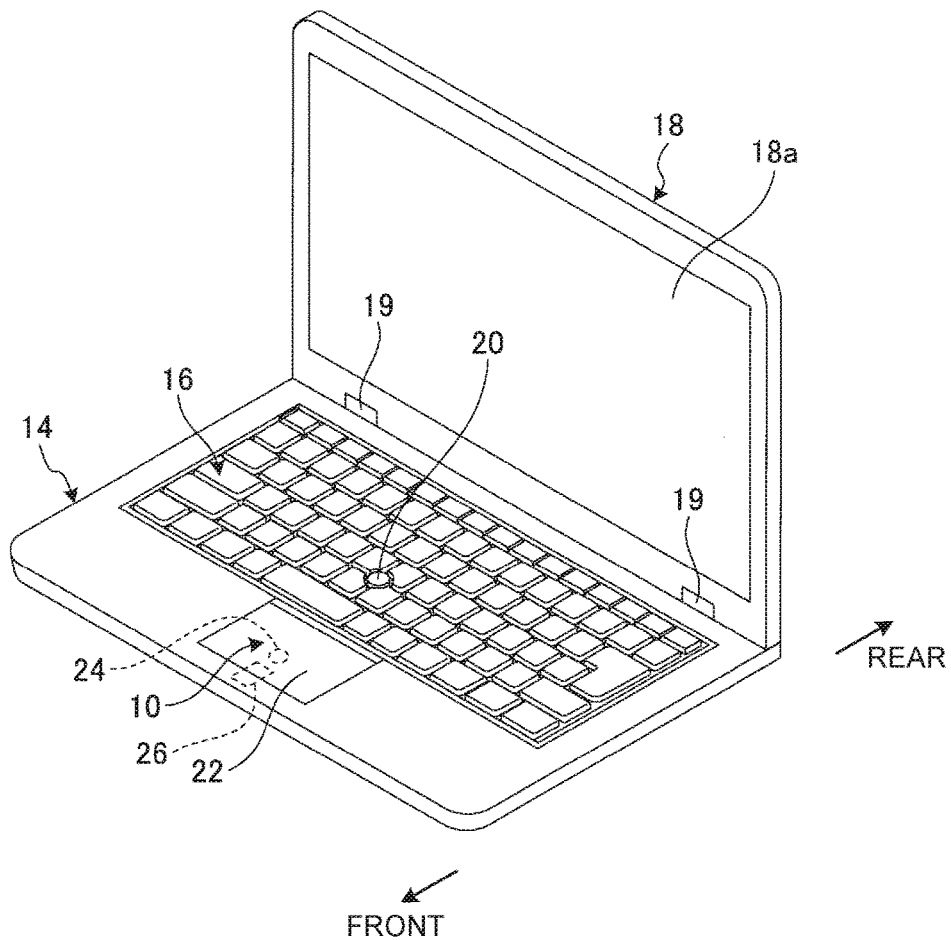
FIG. 1 is a perspective view of an electronic apparatus provided with an input device according to an embodiment of the present invention.

FIG. 1 is a perspective view of an electronic apparatus 12 provided with an input device 10 according to an embodiment of the present invention. The present embodiment illustrates a configuration in which the input device 10 is installed in the electronic apparatus 12, which is a laptop PC. Alternatively, however, the input device 10 may be mounted on a discrete keyboard device or the like connected to a desktop PC or the like.

In the following description, the use mode of the input device 10 in the electronic apparatus 12 illustrated in FIG. 1 will be the standard use mode, and the near side will be referred to as the front side (front), the back side will be referred to as the rear side (rear), the direction of the thickness of a main body chassis 14 will be referred to as the vertical direction, and the width direction will be referred to as the lateral direction.

Referring to FIG. 1, the electronic apparatus 12 includes a main body chassis 14 having a keyboard device 16, and a display device 18 having a display section 18a, such as a liquid crystal display or the like. The display device 18 is connected by a pair of left and right hinges 19 such that the display device 18 is openable and closable with respect to the main body chassis 14.

Accommodated inside the main body chassis 14 are various types of electronic components, such as a substrate, an arithmetic processing device, a hard disk device, and memories (not illustrated). The keyboard device 16 is provided on the upper surface of the main body chassis 14. A pointing stick 20 is provided near the center of the keyboard device 16, and the input device 10 is provided at the center front of the keyboard device 16. The pointing stick 20 is an input means that can be used in place of a mouse to operate a cursor (pointer) shown on the display section 18a.

Figure 2:
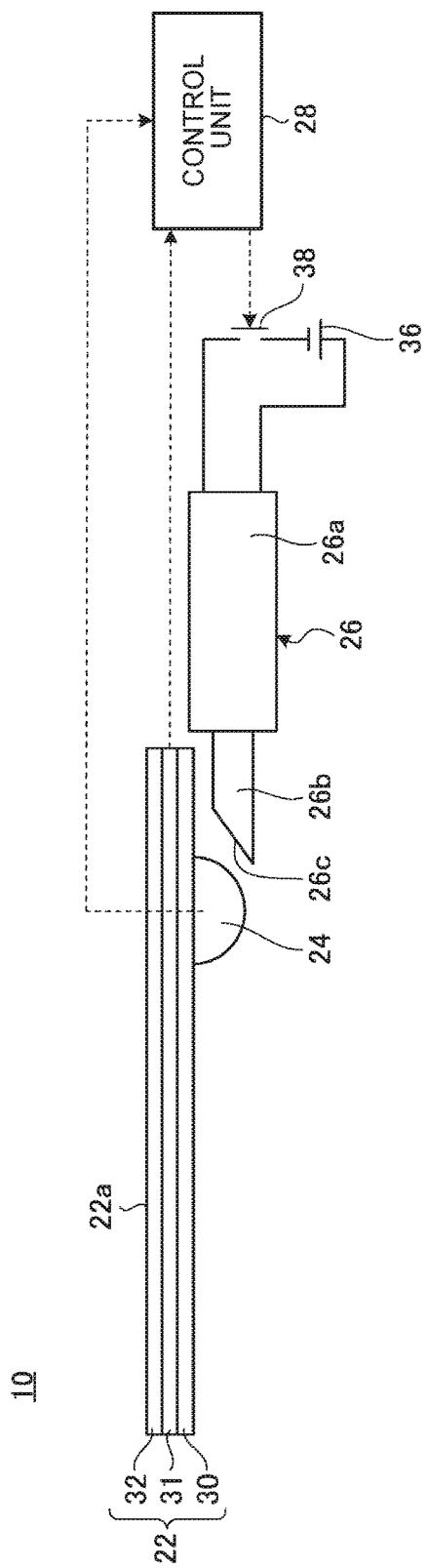
FIG. 2 is a configuration diagram of the input device illustrated in FIG. 1, the input device being observed in side view.
Figure 3:
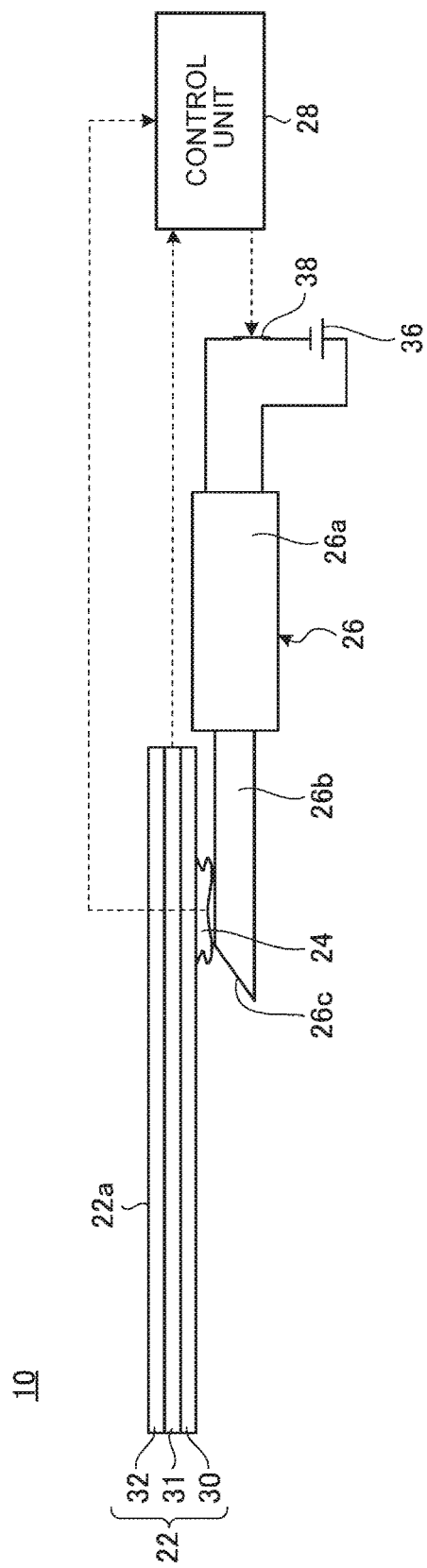
FIG. 3 is an operation diagram illustrating a state in which a click operation has been performed on the input device illustrated in FIG. 2.

FIG. 2 is a configuration diagram of the input device 10 illustrated in FIG. 1, the input device 10 being observed from a side. FIG. 3 is an operation diagram illustrating a state in which a click operation has been performed on the input device 10 illustrated in FIG. 2.

As illustrated in FIG. 2 and FIG. 3, the input device 10 has a touchpad (touch operation section) 22, a vibration generation part 24, an actuator 26, and a control unit 28.

The touchpad 22 accepts a touch operation performed by bringing a fingertip or the like close to or into contact with an operation surface 22a of the front surface of the touchpad 22. A touchpad having a publicly known configuration may be used for the touchpad 22. The touch operation that can be performed on the operation surface 22a of the touchpad 22 includes a sliding operation, in which a finger is slid on the operation surface 22a in the planar direction, and a click operation (tap operation), in which the operation surface 22a is clicked by a finger.

The touchpad 22 has a three-layer construction in which, for example, a sensor plate 31 and a cover plate 32 are stacked on a housing plate 30. The housing plate 30 is formed of a resin plate having a rectangular shape in a planar view and provides the base of the touchpad 22. The sensor plate 31 is a substrate having a rectangular shape in a planar view and functions as a sensor capable of detecting a sliding operation and a click operation performed on the operation surface 22a. The sensor plate 31 is electrically connected to the control unit 28 and is capable of transmitting the detection signals of the sensor plate 31 to the control unit 28. The cover plate 32 is formed of a glass plate or a resin plate having a rectangular shape in a planar view, and the front surface of the cover plate 32 provides the operation surface 22a of the touchpad 22.

The drive of the actuator 26 is controlled by the control unit 28 when a click operation is detected by the sensor plate 31. The actuator 26 is a solenoid which moves a plunger 26b from a case 26a in an axial direction by an electromagnetic force upon receipt of power from a power source 36. The actuator 26 in the present embodiment is a push type solenoid. In a non-energized mode, the actuator 26 is in state in which the plunger 26b is retreated in the case 26a. In an energized mode, the plunger 26b turns into a push bar and moves in a direction to jut out of the case 26a. Reference numeral 38 in FIG. 2 denotes an energizing switch that turns on/off the supply of current to the actuator 26 from the power source 36.

The plunger 26b is disposed such that the plunger 26b is movable in a horizontal direction parallel to the rear surface of the touchpad 22 and can press the vibration generation part 24 from a side (refer also to FIG. 1). The distal end of the plunger 26b is provided with an upward sloping surface 26c, which is tapered toward its distal end for pressing the vibration generation part 24 from a side.

The vibration generation part 24 generates a vibration when pressed by the plunger 26b of the actuator 26 and applies the vibration to the touchpad 22. The vibration generation part 24 in the present embodiment is a metal dome, which is an elastic member formed of a metal and shaped like a hollow dome. The vibration generation part 24 is attached and fixed to the rear surface of the housing plate 30 of the touchpad 22, bulging downward. Thus, when pressed by the plunger 26b of the actuator 26, the vibration generation part 24 develops elastic buckling distortion to generate a vibration (refer to FIG. 3), and transmits the vibration to the touchpad 22.

In the present embodiment, a metal dome switch is used as the vibration generation part 24. More specifically, the vibration generation part 24 is a tactile switch which is electrically connected to the control unit 28 and capable of transmitting its detection signals to the control unit 28.

The control unit 28 performs the overall control of the input device 10 and also transmits and receives signals and information to and from the input device 10 and a controller in the main body chassis 14. The control unit 28 may be composed of the controller in the main body chassis 14. The functions of the control unit 28 may be implemented by having a processing unit, such as a CPU, run a program, i.e. by software, or by hardware, such as an integrated circuit (IC), or by using both software and hardware.

The operation of the input device 10 will now be described.

When the operation surface 22a of the touchpad 22 is clicked, this click operation is detected by the sensor plate 31. Upon receipt of the detection signal indicating the click operation, the control unit 28 performs control to turn on the switch 38 to energize and drive the actuator 26.

When the actuator 26 is driven and the plunger 26b moves to protrude from the case 26a, the vibration generation part 24 is pressed by the sloping surface 26c at the distal end of the actuator 26 and develops the elastic buckling distortion (refer to FIG. 3). This causes the vibration generation part 24 to generate a shock-like vibration, and the vibration is transmitted to the touchpad 22. As a result, the operator can feel the vibration at his or her fingertip, thus obtaining the click feeling, which is the operational feeling when performing the click operation.

At the same time, the vibration generation part 24 composed of the metal dome switch is turned on, and the ON signal is transmitted to the control unit 28. As a result, the control unit 28 performs processing or display based on the click operation on the touchpad 22. For example, the processing corresponding to a click on a mouse is carried out through the cursor on the display section 18a.

The control unit 28 turns on the switch 38 or holds the switch 38 ON for a predetermined time upon receipt of the ON signal from the vibration generation part 24, and then turns off the switch 38. This causes the plunger 26b to retract into the case 26a again, and the vibration generation part 24 restores the original dome shape (refer to FIG. 2).

If a sliding operation on the operation surface 22a is detected by the sensor plate 31, then the control unit 28 can also perform processing or display based on the sliding operation on the touchpad 22. The control of the processing or display based on the click operation or the sliding operation on the touchpad 22 may be performed by the controller in the main body chassis 14 which receives information from the control unit 28.

The vibration generation part 24 may alternatively be composed of a simple metal dome that does not have a switching function. With this configuration, when the detection signal of a click operation on the operation surface 22a is received from the sensor plate 31, the control unit 28 can drive the actuator 26 and simultaneously perform processing or display based on the click operation on the touchpad 22. It is needless to say that the vibration generation part 24 may be composed of a metal dome switch, and control that does not involve the switching function may be performed.

As described above, the input device 10 according to the present embodiment includes the touchpad 22 having the sensor plate 31, which is a sensor capable of detecting a touch operation (click operation) on the operation surface 22a, the actuator 26, which is driven when a touch operation is detected by the sensor plate 31, and the vibration generation part 24, which is provided on the rear surface of the touchpad 22, and which generates a vibration when pressed by the actuator 26 in a driven state and applies the vibration to the touchpad 22.

Thus, without using a mechanical mechanism or the like that vertically moves the touchpad 22, the input device 10 can provide an operator with the click feeling imparted by the vibration from the vibration generation part 24 when a click operation is performed. This makes it possible to provide satisfactory operational feeling while at the same time simplifying the structure of the peripheral sections of the touchpad 22 so as to achieve a reduction in thickness. In addition, the electronic apparatus 12 has the input device 10 installed in the main body chassis 14, thus enabling the main body chassis 14 to be smaller and thinner.

The vibration generation part 24 is an elastic member, which develops elastic buckling distortion when pressed by the actuator 26 thereby to apply a vibration to the touchpad 22. Therefore, the touchpad 22 can be shaken by the vibration from the elastic buckling distortion of the vibration generation part 24, thus making it possible to obtain click feeling that is similar to the click feeling obtained from actual switching.

Figure 4A:
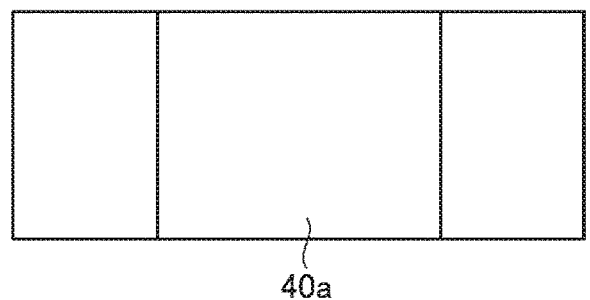
FIG. 4A is a bottom view of a vibration generation part according to a modification example.
Figure 4B:
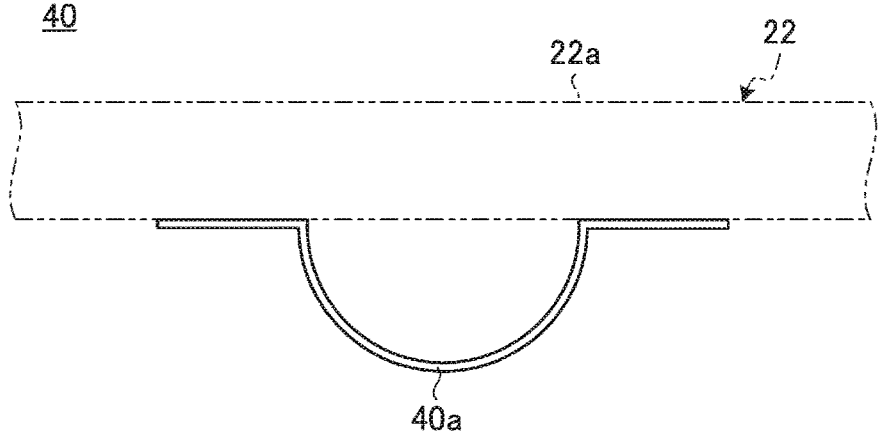
FIG. 4B is a side view of the vibration generation part illustrated in FIG. 4A.

The vibration generation part 24 may have a shape other than the shape of the metal hollow dome. For example, a vibration generation part 40 illustrated in FIG. 4A and FIG. 4B is an elastic member formed by curving a part of a leaf spring member formed of a metal such that the vibration generation part 40 has an arch shape when observed in side view. The vibration generation part 40 is also capable of generating a vibration similar to the vibration of the vibration generation part 24 by causing an arch-shaped bulging portion 40a to develop the elastic buckling distortion by a plunger 26b of an actuator 26. The vibration generation part 40 may also have a switch structure similar to that of a metal dome switch.

The actuator 26 is composed of a solenoid which, when energized, moves the plunger 26b to press the vibration generation part 24 (40). This arrangement simplifies the structure for pressing the vibration generation part 24 (40), thus enabling the entire device to be further simplified and thinner and also permitting a reduction in cost, as compared with a case where, for example, a typical rotary motor is used. Furthermore, the input device 10 can generate a desired vibration merely by pressing the vibration generation part 24 (40) by the plunger 26b of the actuator 26 composed of the solenoid. Hence, the actuator 26 can be controlled substantially by simply being turned on/off, thus obviating the need for detailed control or adjustment.

In this case, the vibration generation part 24 (40) is provided such that the vibration generation part 24 (40) protrudes from the rear surface of the touchpad 22, and the plunger 26b is disposed such that the plunger 26b is movable in a direction parallel to the rear surface of the touchpad 22 so as to press the vibration generation part 24 (40) from a side. In this configuration, the advancing/retracting direction of the plunger 26b coincides with the planar direction of the touchpad 22, thus enabling the entire device to be even thinner. It is needless to say that the vibration generation part 24 (40) may be pressed by the plunger 26b in a different direction, such as in a vertical direction or an oblique direction, from under the vibration generation part 24 (40).

Figure 5:
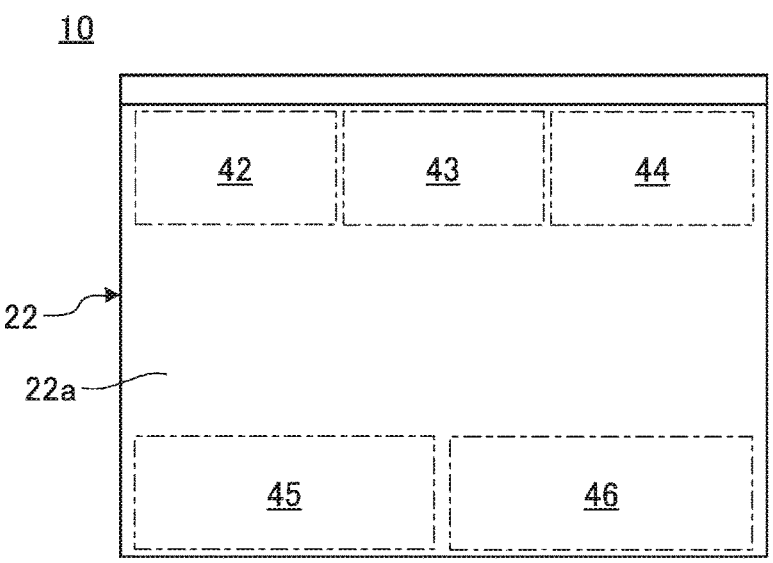
FIG. 5 is a plan view illustrating an example of a pseudo button area set in the input device.

As illustrated in FIG. 5, the operation surface 22a, which is the front surface of the touchpad 22, may be provided with, for example, pseudo button areas 42, 43, 44, 45, and 46. Each of the pseudo button areas 42 to 46 is defined by a coordinate on the touch surface and cannot be visually recognized. When the touchpad 22 is clicked with a fingertip kept in contact with one of the pseudo button areas 42 to 46, the processing or display corresponding to that particular one pseudo button area among the pseudo button areas 42 to 46 is performed. For example, the three pseudo button areas 42 to 44 arranged on the top side of the touchpad 22 function in coordination with a cursor operation performed through the pointing stick 20, and correspond to the left button, the middle button, and the right button, respectively, of a conventional mouse. Further, for example, the two pseudo button areas 45 and 46 arranged on the bottom side of the touchpad 22 function in coordination with the cursor operation performed through the touchpad 22, and correspond to the left button and the right button, respectively, of a conventional mouse.

It is to be understood that the present invention is not limited to the disclosed embodiment described above. To the contrary, the invention can be freely modified insofar as the modifications are within the spirit and scope of the present invention.

For example, the touchpad 22 may be configured to include a pressure-sensitive sensor, such as a strain sensor. In this configuration, the control unit 28 may be configured to drive the actuator 26 when a pressure operation, such as a prolonged pressing, is performed on the operation surface 22a and a detection signal from the pressure-sensitive sensor is received. Alternatively, the control unit 28 may be configured to drive the actuator 26 when a sliding operation and a click operation on the operation surface 22a is detected by the sensor plate 31, the pressure operation, such as the prolonged pressing, is detected by the pressure-sensitive sensor, and the click operation or the pressure operation is accepted, or only when a pressure operation is accepted.

In the foregoing embodiment, the actuator 26 is driven to apply a vibration to the touchpad 22 when a click operation is performed on the touchpad 22. Alternatively, however, the actuator 26 may be driven to apply a vibration to the touchpad 22 when a sliding operation is performed on the touchpad 22, or the actuator 26 may be driven when other various touch operations are performed.

In the foregoing embodiment, the touchpad 22 has been illustrated as the touch operation unit that accepts touch operations. However, the touch operation unit may alternatively be composed of a button switch or the like having a sensor capable of detecting a click operation or a sliding operation, which is a touch operation. Further, the touch operation unit may alternatively be composed of a touchpad area provided on a software keyboard device that virtually displays a keyboard device on a touch panel type display section.

We claim:

1. An input device, comprising:
   a touch operation unit which has a sensor that can detect a touch operation on an operation surface;
   an actuator that is driven when the touch operation is detected by the sensor; and
   a metal dome switch on a rear surface of the touch operation unit, and which generates a vibration by being pressed by the driven actuator, and applies the vibration to the touch operation unit, wherein
   the actuator is a solenoid which moves a plunger to press the metal dome switch when the solenoid is energized, the plunger having an upward sloping surface at a distal end, and
   the plunger is movable in a direction parallel to the rear surface of the touch operation unit, whereby the upward sloping surface can contact the dome switch and then a non-sloping surface of the plunger can contact the dome switch, whereby the plunger compresses the metal dome switch towards the rear surface of the touch operation unit.

2. The input device according to claim 1, wherein the touch operation unit is a touchpad or a button switch.

3. An electronic apparatus comprising:
   an input device having:
      a touch operation unit which has a sensor that can detect a touch operation on an operation surface;
      an actuator that is driven when the touch operation is detected by the sensor;
      a metal dome switch on a rear surface of the touch operation unit, and which generates a vibration by being pressed by the driven actuator, and applies the vibration to the touch operation unit;
   a keyboard device; and
   a display device which performs display based on an input operation performed through the input device and the keyboard device, wherein
   the actuator is a solenoid which moves a plunger to press the metal dome switch when the solenoid is energized, the plunger having an upward sloping surface at a distal end, and
   the plunger is movable in a direction parallel to the rear surface of the touch operation unit so as to press the metal dome switch by the upward sloping surface from a side.

* * * * *